United States Patent [19]

Rydstad

[11] 4,399,618

[45] Aug. 23, 1983

[54] METHOD OF SEALING A FLUIDIZED BED AND DEVICE FOR CARRYING OUT THE METHOD

[76] Inventor: Hans Rydstad, Bollstrasse 638, CH-5413 Birmenstorf, Switzerland

[21] Appl. No.: 306,918

[22] PCT Filed: Feb. 3, 1981

[86] PCT No.: PCT/SE81/00034
§ 371 Date: Sep. 28, 1981
§ 102(e) Date: Sep. 28, 1981

[87] PCT Pub. No.: WO81/02258
PCT Pub. Date: Aug. 20, 1981

[30] Foreign Application Priority Data

Feb. 7, 1980 [SE] Sweden .................................. 8000996

[51] Int. Cl.³ .............................................. F26B 3/08
[52] U.S. Cl. ........................................ 34/10; 34/57 A; 34/242; 432/242
[58] Field of Search ................. 34/57 A, 242, 10; 432/15, 58, 242; 406/138; 414/217

[56] References Cited

U.S. PATENT DOCUMENTS 3,492,740  2/1970  Geipel et al. ...................... 34/57 A

*Primary Examiner*—Larry I. Schwartz
*Attorney, Agent, or Firm*—LeBlanc, Nolan, Shur & Nies

[57] ABSTRACT

A method and a device, FIG. 1, for sealing an opening (15, 8, 10) between two zones in a fluidized bed and/or between the bed and its surrounding (22). In the bed particles (2) are intended to be maintained suspended by means of a carrier gas, which is introduced in the bottom (3) of the bed below the level of aid opening (15, 8, 10). Through said opening (15, 8, 10) primarily workpieces (66) intended to be treated in the bed are intended to pass, which opening (15, 8, 10) is, for example, a horizontal gap in a vertical partition wall (11, 9) between the zones (12, 13, 14) or between the bed and its surrounding (22). The method according to the invention is characterized in that a heap (19, 27) or several heaps (19, 27) of particles (2), by utilizing the movements of the particles (2) and carrier gas in the bed, are caused to be built up at said opening (15, 8, 10) to such a height that the opening (15, 8, 10) is covered or substantially covered by the heap/heaps (19, 27) of particles (2). Workpieces (6) during their passage through the opening (15, 8, 10), and therewith through the sealing, demolish the heap/heaps (19, 27), whereafter said heap/heaps (19, 27) are built up again during and/or after the passage of the workpieces (6).

5 Claims, 4 Drawing Figures

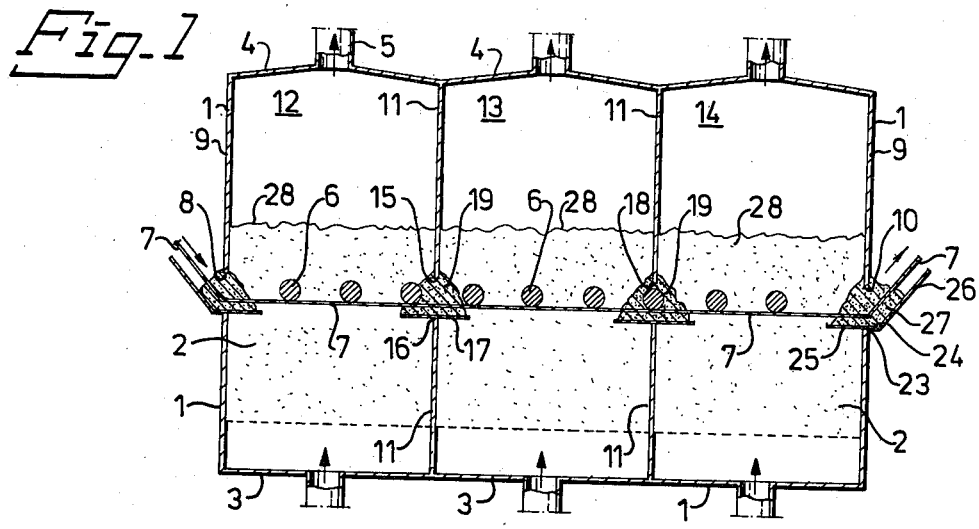
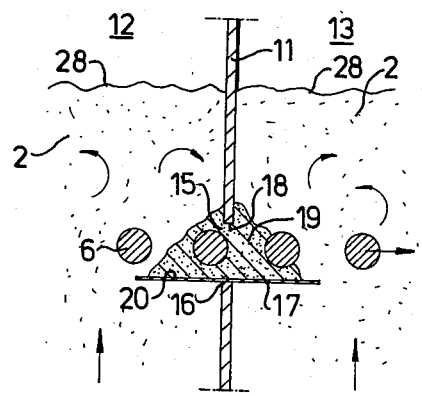
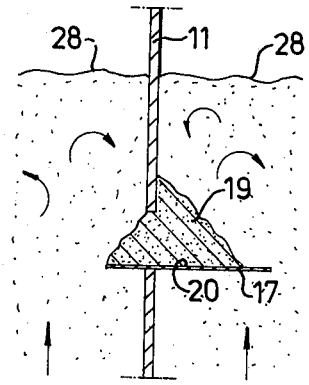
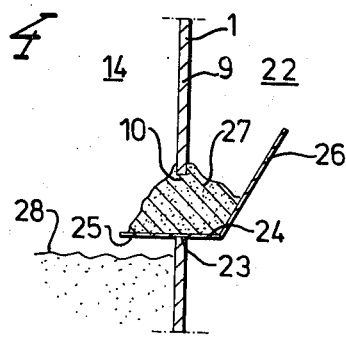

METHOD OF SEALING A FLUIDIZED BED AND DEVICE FOR CARRYING OUT THE METHOD

This invention relates to a method of sealing at a fluidized bed and to a device for carrying out the method. The sealing refers primarily to openings between zones or sections in the bed or between the bed and its surrounding.

A fluidized bed consists in principle of a container, which partially is filled with solid small particles, of which by injection of gas, usually through the container bottom, the major part is maintained suspended, in such a manner, that the suspended particles and the gas together constitute a system, which owns many properties of a fluid. In order to bring about and maintain fluidization, of course, certain conditions must be met.

It was found that a very good and uniform heat transfer can be achieved between the bed, i.e. the suspended particles and the gas, and objects occurring in the bed and having a temperature different from that of the bed. Therefore, fluidized beds are utilized a.o. (abbreviation for among other things) for the heat treatment of, for example, large workpieces of steel, which require efficiently controlled and uniform heating and cooling in order a.o. not to get distorted.

Fluidized beds also can be used as "cooling beds" for the cooling of cast or hot-worked, for example hot-rolled products in connection, for example, with steel manufacture. Fluidized beds offer in this respect a number of advantages, such as reduced bed size and improved environment in connection with the bed, compared with cooling beds using free or forced air cooling as in conventional cooling beds.

For controlling the cooling, it may be expedient in many cases to divide the bed into several zones or sections, through which the workpieces to be cooled in the bed are to pass.

One problem in connection therewith, of course, is to effect sealing between the zones. The workpieces namely are to be transported between the zones, i.e. are to be transferred from a certain zone to an adjacent zone after having stayed for a certain period in the firstmentioned zone, and for this reason there must be openings between the zones. A corresponding problem prevails in connection with the introduction of workpieces into the bed and their removal out of the same. Transfer of bed material between the zones can be tolerated only to a small degree, because otherwise the possibility of adjusting and controlling would be poor. Bed material must not leak out from the bed, either, when the workpieces are being fed in and discharged, because such leakage would yield a.o. an unsatisfactory environment about the bed and increase operation costs.

It was found to be very difficult, at the infeed and discharge to effect sealing between the zones by applying conventional technique. The difficulty is due to several factors, a.o. high temperature as well as clogging and wear caused by the bed material. The cooling bed has to meet very high requirements on reliable operation, because the bed mostly must be capable of receiving workpieces at the rate and time at which the workpieces are delivered from other equipment, for example a rolling mill in which they have been worked.

The present invention relates to a method and a device for sealing, at which the bed material is utilized, and the sealing is not stationary, but is built up partially during operation.

The invention, thus, relates to a method of sealing an opening between two zones in a fluidized bed and/or between the bed and its surrounding, in which bed particles are intended to be maintained suspended by means of a carrier gas, which is introduced into the bed bottom beneath the level of the opening, through which primarily workpieces to be treated in the bed are intended to pass, and which opening, for example, is a horizontal gap in a vertical partition wall between the zones or between the bed and its surrounding.

The method is characterized in that a heap or several heaps of particles, by utilizing the movements of the particles and carrier gas in the bed, are caused to build up at the opening to such a height, that each opening is covered or substantially covered by a heap of particles, and that workpieces at their passage through the opening, and therewith through the sealing effected by the associated heap, will disrupt or demolish the heap, whereafter the heap is built up again during and/or after the passage of the workpieces.

The invention also relates to a device for sealing an opening between two zones in a fluidized bed and/or between the bed and its surrounding, in which bed particles are intended to be maintained suspended by means of a carrier gas intended to be introduced in the bed bottom beneath the opening, through which opening primarily workpieces to be treated in the bed are intended to pass, and which opening is, for example, a horizontal gap in a partition wall between the zones or between the bed and the surrounding and where, by utilizing the movements of the particles and carrier gas in the bed, one or several heaps are intended to be built up to cover or substantially cover the opening.

The device is characterized in that a plane, such as a metal sheet or similar object is located in connection to the lower edge of each of the openings, that the metal sheets are arranged so that the workpieces are allowed to pass through the openings, and so that the heaps are allowed to be built up on the metal sheets, which are arranged horizontally in relation to the lower edge and project laterally from the partition wall, so that the width of the projecting sheet portions are at least equal to the height dimension of the opening.

The invention is described in greater detail in the following, with reference to the accompanying drawing, in which FIG. 1 shows schematically an embodiment of a fluidized bed for the cooling of workpieces, where sealing between the zones of the bed and at infeed and discharge is effected by embodiments of sealings according to the present invention, which Figure is a vertical section through the bed in parallel with the intended feed direction of the workpieces, FIG. 2 is a enlarged detail section corresponding to that in FIG. 1 through a first embodiment of a sealing according to the invention between two zones in the bed, FIG. 3 is a enlarged detail section corresponding to that in FIG. 1 through a second embodiment of a sealing according to the invention between two zones in the bed, and FIG. 4 is a enlarged detail section corresponding to that in FIG. 1 through a sealing according to the invention at an infeed or discharge opening of the bed.

The fluidized bed shown schematically in FIG. 1 comprises a container 1, which encloses the main part of the bed. The bed has substantially rectangular or square horizontal cross-section.

The container 1 is substantially parallelepipedic and partially filled with solid small particles 2, which are intended to be maintained suspended by means of a carrier gas, which usually is introduced at the bottom 3 of the bed, container, as indicated by arrows in FIG. 1. Preferably in the roof 4 of the container 1 outlets 5 for carrier gas having passed through the bed as indicated by arrows in FIG. 1 are located.

For the transport of workpieces 6 to be treated in the bed, a conveying means 7 of a suitable kind is provided so that at an opening 8, for example in the form of a horizontal gap 8 in one of the vertical outer walls 9 of the container 1, workpieces 6 are introduced into the bed, transported through the bed and removed therefrom through an opening 10, corresponding to the opening 8, in a second corresponding outer wall 9, preferably the one which includes the opening 8, as shown in FIG. 1.

11 designates vertical partition walls in the bed which in this case are two in number and arranged so as to divide the bed into three zones 12,13 and 14, respectively. Each partition wall 11 includes at least one opening 15, each having the form of, for example, a horizontal gap of a definite height, through which the workpieces 6 are intended to pass.

In FIG. 2 the opening 15 between the zones 12 and 13 in the partition wall 11 is shown in greater detail. In connection to the lower edge 16 of the opening 15 a plane 17, such as a metal sheet 17, is located horizontally and projects from the partition wall 11 so that the width of the projecting portion or portions at least amounts to the height of the opening 15, i.e. the distance between its lower edge 16 and its upper edge 18. In FIG. 2 an embodiment is shown, where said plane or metal sheet 17 projects substantially an equal distance in each zone 12,13. In FIG. 3 an embodiment is shown, where the metal sheet 17 projects a substantially longer distance in the zone 13 than in the zone 12.

On the plane or metal sheet 17 one or several heaps 19 of particles 2 are intended to be built up by utilizing the movements of the particles 2 and carrier gas in the bed. The heap or heaps 19 are built up on the upper surface 20 of said metal sheet. The width of the metal sheet portions projecting from the partition wall 11 should be at least a distance, which approximately corresponds to the height of the opening 15 or exceeds the distance so that the heap or heaps 19 being built up assume such a height, that the opening 15 is covered by the heap or heaps. The height assumed by the heap or heaps depends, in addition to said width, also on the operation characteristics of the bed, such as fluidization degree, gas rate etc. The width, therefore, must be adjusted to these characteristics.

The heap or heaps 19 are built up, in that the upper surface of the metal sheet 17 partially is shielded off from the flow of gas and particles which is directed upward from the bottom 3 as indicated by the arrows in FIGS. 2 and 3. When the metal sheet 17 projects substantially an equal distance in each zone, as in FIG. 2, a substantially symmetric heap is formed, its "top" being at the partition wall 11 and inclining therefrom down to the metal sheet 17. When the metal sheet, as in FIG. 3, projects substantially only in one of the zones, the greater part of the heap will be found in this zone.

When in each zone a metal sheet 17 projects which is long in relation to the gap height, the build-up of a heap 19 in each zone can be imagined.

The metal sheet 17, of course, is arranged so that the workpieces are allowed to pass through the opening 15, and, for example, is arranged horizontally as shown in FIGS. 1–3.

The function of the sealing is as follows. Workpieces 6, shown in FIG. 2 but not in FIG. 3, are transported through the bed by a conveying means (not shown in FIGS. 2 and 3) and are caused to pass through the openings 15. Hereby, the sealing heap or heaps 19 at each opening are disrupted or demolished at the passage of each workpiece 6. During and after the passage of each workpiece 6 the heap or heaps 19 are built up again by the particle and gas movements in the bed.

In FIG. 4 the zone 14 of the bed and the opening 10 are shown. 22 designates the surrounding of the bed. In connection to the lower edge 23 of the opening 10 a metal sheet 24 or the like is located which includes a substantially horizontal portion 25 corresponding to the metal sheets 17, and a longitudinal upward angled portion 26 located substantially in the surrounding 22 of the bed, i.e. on the outside of the bed.

The function of the sealing between the bed and its surrounding 22 is substantially the same as at the sealing between zones in the bed, i.e. one or several heap or heaps 27 of particles are built up to such a height that the opening 10 is covered. The angular metal sheet portion 26 forms a pocket, in which particles are collected which have accumulated on the workpieces 6 and drop down when the workpieces are removed from the bed through the opening 10. The particles are hereby returned to the sealing heap or heaps 27.

For sealing between the bed and the surrounding 22 according to above at the feed opening 8 or discharge opening 10, the opening can be arranged either below the upper surface 28 of the bed as in FIG. 1 or above the upper surface 28 of the bed as in FIG. 4. When the opening is located above the upper surface 28 of the bed, the heap or heaps are built up of particles torn off from the bed and of particles taken along by the workpieces 6. In this connection the particle amount can be completed, for example by returning torn-off particles.

The method according to the invention and some embodiments of a device for carrying out the method have been described above.

It should have been understood therefrom that sealing according to the invention can be carried out simply, cheaply and without any such problems as they normally arise at sealing in the environment here concerned. The sealing, thus, is substantially maintenance-free and completely reliable in operation.

It is, of course, possible to imagine a plurality of embodiments of a sealing according to the invention, without abandoning the invention idea. The metal sheet 17, for example, may consist of several parts, for example two, and the portion projecting in each zone may be arranged, for example, slightly below the lower edge 16 of the opening 15 and be angled upward in order, when necessary, to improve the retention capacity of particle heaps. Alternatively, an outer portion of each projecting portion can be angled upward.

The openings 8,10,15 need not be designed as horizontal gaps, but sealing according to the invention is applicable to any opening form, for example circular.

When sealing a feed opening or a discharge opening, the sealing can be made still more effective by controlling the difference in pressure between the bed and the surrounding. The pressure difference should be small above the opening. Preferably a certain vacuum should prevail in the bed portion adjacent the opening relative to the suroounding.

The invention, thus, must not be regarded restricted to the embodiments described above, but can be varied within the scope of the attached claims.

I claim:

1. A method of sealing an opening between two zones in a fluidized bed container and/or between the bed and its surrounding, in which bed particles are intended to be maintained suspended by means of a carrier gas, which is introduced in the bed bottom below the level of said opening, the primary purpose of the opening being to enable passage therethrough of workpieces intended to be treated in the bed, and which opening is, for example, a horizontal gap in a vertical partition wall between the zones or in a wall of the fluidized bed container between the bed and its surrounding, characterized in that by utilizing the movements of the particles and carrier gas in the bed and means at the opening at least a heap of particles is caused to be built up at the said opening to such a height, that the opening is effectively closed and sealed against passage of the carrier gas therethrough by the heap of particles, workpieces being subjected to treatment in the fluidized bed container are passed through the opening and thereupon through the sealing heap of particles, causing disruption and at least partial demolishing of the built up heap of particles at the opening, and after the workpiece has passed through the opening the heap of particles is rebuilt by the movements of the carrier gas and the particles of the fluidized bed to again effectively close and seal the opening against passage of carrier gas therethrough.

2. A method as defined in claim 1, characterized in that the means at the opening is a sheet metal means providing a horizontal platform at the lower edge of the opening enabling a support base for the sealing heap of particles.

3. In a fluidized bed container which has vertical walls containing the fluidized bed in at least one fluidized bed zone; at least one of said walls having an opening therethrough intermediate the vertical extend of said wall; in said bed, particles are adapted to be maintained suspended in a fluidized state by carrier gas adapted to be introduced into the bed bottom below the level of said opening; said opening enabling passage therethrough of workpieces intended to be treated in the said fluidized bed zone; said opening being a horizontal gap in said wall, the improvement being: means for sealing the opening by utilizing the movements of the particles and carrier gas of the fluidized bed to build up a heap of particles at the opening which effectively closes and seals the opening against passage of the carrier gas, said means comprising a plane structure such as a metal sheet or the like provided on and projecting from both sides of the lower edge of the wall opening and arranged so that workpieces are allowed to pass through the opening and to provide a base upon which the said heap of particles is allowed to be built up, the projection of said plane structure laterally from each side of the wall being of a dimension so that the width of projecting plane structure at each side is at least equal to the height of said opening.

4. A means for sealing an opening in a wall of a fluidized bed as defined in claim 3 wherein said container includes two fluidized bed zones separated by a vertical interior partition wall and said partition wall includes said at least one opening and said plane structure projects to a horizontal plane substantially an equal distance into each zone adjacent said opening.

5. A means for sealing an opening in a wall of a fluidized bed as defined in claim 3, wherein said opening is in a vertical wall between the fluidized bed and the exterior surroundings of the fluidized bed container and said plane structure which projects to the exterior side of the wall includes a longitudinal upward angled portion of lateral extent adjacent the lateral extent of said opening.

* * * * *

UNITED STATES PATENT AND TRADEMARK OFFICE
CERTIFICATE OF CORRECTION

PATENT NO. : 4,399,618
DATED : August 23, 1983
INVENTOR(S) : Hans Rydstad

It is certified that error appears in the above-identified patent and that said Letters Patent is hereby corrected as shown below:

Column 6, line 4, "extend" should read -- extent --.

Signed and Sealed this

Sixth Day of March 1984

[SEAL]

*Attest:*

GERALD J. MOSSINGHOFF

*Attesting Officer*  *Commissioner of Patents and Trademarks*